United States Patent
Fukuroda et al.

(10) Patent No.: US 10,907,035 B2
(45) Date of Patent: Feb. 2, 2021

(54) PROPYLENE RESIN COMPOSITION AND INJECTION-MOLDED ARTICLE THEREOF

(71) Applicant: Sumitomo Chemical Company, Limited, Tokyo (JP)

(72) Inventors: Hiroshi Fukuroda, Ichihara (JP); Toshiya Maruyama, Ichihara (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 40 days.

(21) Appl. No.: 16/307,815

(22) PCT Filed: Jun. 6, 2017

(86) PCT No.: PCT/JP2017/020953
§ 371 (c)(1),
(2) Date: Dec. 6, 2018

(87) PCT Pub. No.: WO2017/213126
PCT Pub. Date: Dec. 14, 2017

(65) Prior Publication Data
US 2019/0264016 A1 Aug. 29, 2019

(30) Foreign Application Priority Data
Jun. 7, 2016 (JP) .................................. 2016-113281

(51) Int. Cl.
C08L 23/12 (2006.01)
B29C 45/00 (2006.01)
C08K 3/34 (2006.01)
C08K 5/1575 (2006.01)
C08L 23/08 (2006.01)
C08K 7/00 (2006.01)
B29K 23/00 (2006.01)

(52) U.S. Cl.
CPC .............. *C08L 23/12* (2013.01); *B29C 45/00* (2013.01); *B29C 45/0001* (2013.01); *C08K 3/34* (2013.01); *C08K 5/1575* (2013.01); *C08K 7/00* (2013.01); *C08L 23/08* (2013.01); *C08L 23/0815* (2013.01); *B29K 2023/08* (2013.01); *B29K 2023/12* (2013.01); *C08K 2201/005* (2013.01)

(58) Field of Classification Search
CPC ................................ C08L 23/08; C08L 23/12
See application file for complete search history.

(56) References Cited

U.S. PATENT DOCUMENTS

| | | |
|---|---|---|
| 2001/0040320 A1 | 11/2001 | Kobayashi et al. |
| 2003/0094767 A1* | 5/2003 | Storaasli et al. |
| 2003/0099446 A1* | 5/2003 | Witt et al. |
| 2007/0197712 A1* | 8/2007 | Fujiwara ............... B32B 27/18 524/451 |
| 2009/0081462 A1* | 3/2009 | Miyoshi .................. C08J 5/043 428/407 |
| 2011/0124817 A1 | 5/2011 | Dias et al. |
| 2015/0353710 A1 | 12/2015 | Ayabe et al. |

FOREIGN PATENT DOCUMENTS

| | | |
|---|---|---|
| EP | 0265075 A2 | 4/1988 |
| JP | S59066435 A | 4/1984 |
| JP | S63095252 A | 4/1988 |
| JP | H08283489 A | 10/1996 |
| JP | 2000143835 A | 5/2000 |
| JP | 2004250578 A * | 9/2004 |
| JP | 2010077396 A | 4/2010 |
| JP | 2011074130 A | 4/2011 |
| JP | 2011074131 A | 4/2011 |

(Continued)

OTHER PUBLICATIONS

Machine Translation of JP 2015096586 (Year: 2020).*
Extended European Search Report dated Jan. 10, 2020 in EP Application No. 17810301.6.
Translation of International Preliminary Report on Patentability dated Dec. 11, 2018 in International Application No. PCT/JP2017/020953.
Translation of International Search Report dated Jul. 18, 2017 in International Application No. PCT/JP2017/020953.
Office Action dated Sep. 1, 2020 in JP Application No. 2018522501.
Office Action dated Sep. 25, 2020 in CN Application No. 201780034950.8.

*Primary Examiner* — Michael M Dollinger
(74) *Attorney, Agent, or Firm* — Panitch Schwarze Belisario & Nadel LLP

(57) ABSTRACT

A propylene resin composition containing (A), (B), (C), and (D) is provided. The content of (A) is 40 to 65 parts by weight, the content of (B) is 10 to 25 parts by weight, the content of (C) is 25 to 35 parts by weight, and the content of (D) is 0.01 to 0.3 parts by weight based on the total weight of (A), (B), and (C) being 100 parts by weight. (A) is a propylene-based polymer, (B) is an ethylene-α-olefin copolymer, (C) is a talc whose ratio of D50[L] to D50[S] is at least 4, and (D) is a nucleating agent having formula (1):

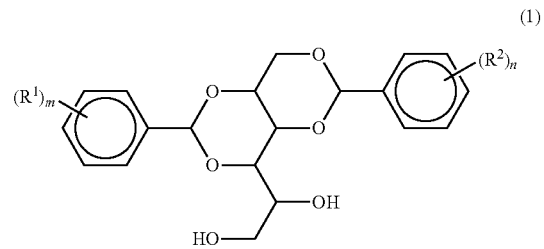

(1)

$R^1$ and $R^2$ each independently represent an alkyl group having 1 to 8 carbon atoms or a halogen group, and m and n each independently represent an integer of 1 to 5. A molded article produced from the composition has low linear expansion coefficients.

2 Claims, No Drawings

(56) References Cited

FOREIGN PATENT DOCUMENTS

| | | | |
|---|---|---|---|
| JP | 2013512310 | A | 4/2013 |
| JP | 2014058614 | A | 4/2014 |
| JP | 2015096586 | A | 5/2015 |
| WO | 99024496 | A1 | 5/1999 |
| WO | 2006044187 | A1 | 4/2006 |
| WO | 2012020106 | A1 | 2/2012 |
| WO | 2014115385 | A1 | 7/2014 |

* cited by examiner

PROPYLENE RESIN COMPOSITION AND INJECTION-MOLDED ARTICLE THEREOF

CROSS-REFERENCE TO RELATED APPLICATIONS

This application is a Section 371 of International Application No. PCT/JP2017/020953, filed Jun. 6, 2017, which claims priority under 35 U.S.C. § 119(b) to Japanese Application No. 2016-113281, filed Jun. 7, 2016, the disclosures of which are incorporated herein by reference in their entirety.

TECHNICAL FIELD

The present invention relates to a propylene-based resin composition and an injection-molded article thereof.

BACKGROUND ART

Molded articles made of a propylene-based resin composition mainly based on a propylene-based resin have been used as automotive members and home appliance product members. In molded articles to be used for these applications, high dimension stability is desired, and for example, Patent Literature 1 mentions that a molded article made of a propylene-based resin composition containing a specific propylene-ethylene block copolymer, a specific propylene-based polymer, a specific ethylene-α-olefin copolymer, a filler, and a nucleating agent is excellent in dimension stability.

CITATION LIST

Patent Literature

Patent Literature 1: Japanese Unexamined Patent Application Publication No. 2010-77396

SUMMARY OF INVENTION

Technical Problem

However, from the dimension stability of a molded article made of a propylene-based resin composition, a further improvement is required. Specifically, it is required to further reduce both the linear expansion coefficients of the molded article in the flow direction of the resin (hereinbelow, referred to as the MD) and in the width direction perpendicular to the MD (hereinbelow, referred to as the TD).

In consideration of the problem described above, it is an object of the present invention to provide a propylene-based resin composition enabling production of a molded article in which the linear expansion coefficient each in the MD and the TD is small.

Solution to Problem

The problem described above of the present invention has been solved by the following means.

That is, the present invention provides a propylene-based resin composition comprising the following component (A), the following component (B), the following component (C) and the following component (D), wherein based on the total weight of the component (A), the component (B) and the component (C), taken as 100 parts by weight, the content of the component (A) is 40 to 65 parts by weight, the content of the component (B) is 10 to 25 parts by weight, the content of the component (C) is 25 to 35 parts by weight, and the content of the component (D) is 0.01 to 0.3 parts by weight:

component (A): a propylene-based polymer;
component (B): an ethylene-α-olefin copolymer;
component (C): a talc whose ratio of the average particle size D50[L] as measured by a laser diffraction method to the average particle size D50[S] as measured by a centrifugal sedimentation method (D50[L]/D50[S]) is at least 4; and
component (D): a nucleating agent represented by the following formula (1):

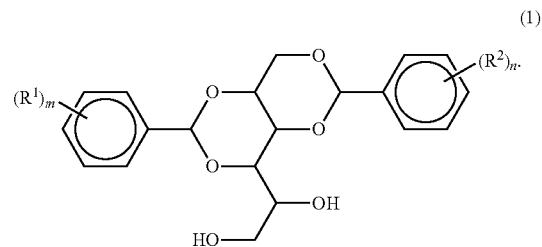

(1)

wherein $R^1$ and $R^2$ each independently of each other represent an alkyl group having 1 to 8 carbon atoms or a halogen group, and m and n each independently of each other represent an integer of 1 to 5,
when m is 2 or more, a plurality of $R^1$ present may be the same or different from each other; and
when n is 2 or more, a plurality of $R^2$ present may be the same or different from each other.

Advantageous Effects of Invention

According to the present invention, it is possible to provide a propylene-based resin composition enabling production of a molded article in which the linear expansion coefficient each in the MD and the TD is small.

DESCRIPTION OF EMBODIMENTS

Definitions

In the present description, the term "propylene-based resin composition" means a composition comprising a propylene-based polymer of more than 50% by weight and one or more other components.

In the present description, the term "propylene-based polymer" means a polymer or copolymer that contains constituent units derived from propylene in a content of more than 50% by weight of the amount of the total constituent units.

In the present description, the term "injection-molded article" means a molded article produced by an injection molding method.

[Propylene-Based Resin Composition]

The propylene-based resin composition according to the present invention (hereinbelow, simply also referred to as the "resin composition") is a propylene-based resin composition comprising the following component (A), the following component (B), the following component (C) and the following component (D):

component (A): a propylene-based polymer;
component (B): an ethylene-α-olefin copolymer;
component (C): a talc whose ratio of the average particle size D50[L] as measured by a laser diffraction method to the average particle size D50[S] as measured by a centrifugal sedimentation method (D50[L]/D50[S]) is at least 4; and
component (D): a nucleating agent represented by the following formula (1):

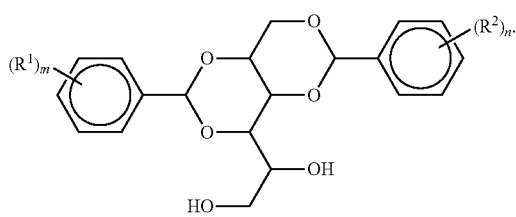

(1)

wherein $R^1$ and $R^2$ each independently of each other represent an alkyl group having 1 to 8 carbon atoms or a halogen group, and in and n each independently of each other represent an integer of 1 to 5;
when m is 2 or more, a plurality of $R^1$ present may be the same or different from each other; and
when n is 2 or more, a plurality of $R^2$ present may be the same or different from each other.

In the present description, the description "lower limit to upper limit", which represents a numeric range, represents "lower limit or more and upper limit or less", that is, represents a numeric range including the upper limit and the lower limit.

Hereinbelow, each of the components will be described.

Component (A)

The component (A) in the present invention is a propylene-based polymer, which is a polymer having constituent units derived from propylene of more than 50% by weight based on the total amount of the polymer. Examples of the propylene-based polymer include propylene homopolymers and copolymers of propylene with another monomer. The resin composition according to the present invention may contain one propylene-based polymer or may contain two or more propylene-based polymers. The copolymer may be a random copolymer or may be a block copolymer. Hereinbelow, a random copolymer of propylene with another monomer is referred to as a "propylene-based random copolymer", and a block copolymer of propylene with another monomer is referred to as a "propylene-based block copolymer". From the viewpoint of the rigidity and impact resistance of a molded article made of the resin composition, a propylene homopolymer or a block copolymer of propylene with another monomer is preferred.

Examples of the propylene-based random copolymer include a random copolymer made of constituent units derived from propylene and constituent units derived from ethylene (hereinbelow, this may be denoted as the first random copolymer); a random copolymer made of constituent units derived from propylene and constituent units derived from an α-olefin other than propylene (hereinbelow, this may be denoted as the second random copolymer); and a random copolymer made of constituent units derived from propylene, constituent units derived from ethylene, and constituent units derived from an α-olefin other than propylene (hereinbelow, this may be denoted as the third random copolymer). In the present description, the term "α-olefin" means an organic compound including a carbon atom chain having a terminal carbon-carbon double bond (C=C) (or "an olefin having three or more carbon atoms and having a —CH=$CH_2$ group").

Examples of the propylene-based block copolymer include polymerization materials comprising a polymer component (I) comprising a propylene homopolymer or a polymer having constituent units derived from propylene and a polymer component (II) comprising a copolymer of propylene with at least one comonomer selected from the group consisting of ethylene and α-olefins other than propylene.

In the propylene-based polymer of the component (A), from the viewpoint of the rigidity of the molded article made of the resin composition, the isotactic pentad fraction to be measured by $^{13}$C-NMR (may be denoted as a [mmmm] fraction) is preferably 0.97 or more, and more preferably 0.98 or more. It should be noted that the isotactic pentad fraction is a value to be determined by a measurement method described below. The closer to 1 the isotactic pentad fraction of the propylene-based polymer, the higher the stereoregularity of the molecular structure of the propylene-based polymer, and the higher the crystallinity of the propylene-based polymer.

Alternatively, when the component (A) is the above propylene-based random copolymer or the above propylene-based block copolymer, the isotactic pentad fraction is a value to be measured with respect to the linkage of propylene units in the copolymer.

In the propylene-based polymer of the component (A), the melt flow rate to be measured at 230° C. and under a load of 2.16 kgf in compliance with JIS K7210 (hereinbelow, the melt flow rate is denoted as MFR) is preferably 15 g/10 minutes or more, and more preferably 18 to 150 g/10 minutes, from the viewpoint of the fabricability of the resin composition.

It is possible to produce the propylene-based polymer of the component (A) using a polymerization catalyst by the following polymerization method.

Examples of the polymerization catalyst include Ziegler type catalyst systems, Ziegler-Matta type catalyst systems, catalyst systems composed of a compound having a cyclopentadienyl ring of a transition metal of Group 4 of the periodic table and an alkyl aluminoxane, catalyst systems composed of a compound having a cyclopentadienyl ring of a transition metal of Group 4 of the periodic table, a compound capable of reacting with the transition metal compound to form an ionic complex, and an organoaluminum compound, and catalyst systems prepared by making inorganic particles such as silica and clay mineral to support catalyst components such as a compound having a cyclopentadienyl ring of a transition metal of Group 4 of the periodic table, a compound to form an ionic complex, and an organoaluminum compound and modifying the inorganic particles. Preliminarily polymerized catalysts which are prepared by preliminarily polymerizing ethylene or an α-olefin in the presence of the above catalyst systems may also be used. Examples of the Ziegler-Natta type catalyst systems include catalyst systems in which a solid transition metal component containing titanium is used in combination with an organic metal component.

Examples of the above catalyst systems include catalyst systems described in Japanese Unexamined Patent Application Publication No. S61-218606, Japanese Unexamined Patent Application Publication No. H5-194685, Japanese Unexamined Patent Application Publication No. H7-216017, Japanese Unexamined Patent Application Publication No. H9-316147, Japanese Unexamined Patent Application Publication No. H10-212319, and Japanese Unexamined Patent Application Publication No. 2004-182981.

Examples of the polymerization method include bulk polymerization, solution polymerization, and gas phase polymerization. Herein, the bulk polymerization is a method in which polymerization is carried out using, as a medium, an olefin that is liquid at the polymerization temperature, and the solution polymerization is a method in which polymerization is carried out in an inert hydrocarbon solvent such as propane, butane, isobutane, pentane, hexane, heptane, and octane. The gas phase polymerization is a method in which, by using a gaseous monomer as a medium, a gaseous monomer is polymerized in the medium.

Examples of the polymerization mode include a batch system, a continuous system, and a combination thereof. The polymerization mode may be a multistage system to be performed using a plurality of polymerization reaction vessels linked in series. From industrial and economical viewpoints, preferred is a method based on a continuous gas phase polymerization method or a bulk-gas phase polymerization method in which a bulk polymerization method and a gas phase polymerization method are performed continuously.

It should be noted that the conditions of each polymerization step (polymerization temperature, polymerization pressure, monomer concentration, amount of catalyst to be placed, polymerization time, and the like) may be determined appropriately depending on the intended component (A).

In the production of the propylene-based polymer of the component (A), in order to remove a residual solvent contained in the obtained propylene-based polymer, ultra-low molecular weight oligomers, and the like by-produced during the production, the obtained propylene-based polymer may be retained at a temperature lower than the temperature at which the residual solvent, the oligomers, and the like may vaporize and the propylene-based polymer melts. Examples of a method for removing impurities such as the residual solvent and the oligomers include methods described in Japanese Unexamined Patent Application Publication No. S55-75410 and Japanese Patent No. 2565753.

<Propylene Homopolymer>

When the component (A) is a propylene homopolymer, from the viewpoint of making the fluidity of the resin composition in melting and the toughness of the molded article satisfactory, the limiting viscosity number of the propylene homopolymer to be measured in tetralin at 135° C. (hereinbelow, may be denoted as [η]) is preferably 0.1 to 2 dl/g, more preferably 0.5 to 1.5 dl/g, and still more preferably 0.7 to 1.4 dl/g.

The molecular weight distribution of the propylene homopolymer measured by gel permeation chromatography (hereinbelow, denoted as GPC) (hereinbelow, the molecular weight distribution may be denoted as Mw/Mn) is preferably 3 or more and less than 7, and more preferably 3 to 5.

<Propylene-Based Random Copolymer>

As mentioned above, examples of the propylene-based random copolymer are a random copolymer made of constituent units derived from propylene and constituent units derived from ethylene (i.e., a first random copolymer); a random copolymer made of constituent units derived from propylene and constituent units derived from an α-olefin other than propylene (i.e., a second random copolymer); and a random copolymer made of constituent units derived from propylene, constituent units derived from ethylene, and constituent units derived from an α-olefin other than propylene (i.e., a third random copolymer).

The α-olefin other than propylene constituting the above propylene-based random copolymer is preferably an α-olefin having 4 to 10 carbon atoms, examples of such α-olefins include 1-butene, 1-pentene, 1-hexene, 4-methyl-1-pentene, 1-octene, and 1-decease, and preferred are 1-butene, 1-hexene, and 1-octene.

Examples of the random copolymer made of constituent units derived from propylene and constituent units derived from an α-olefin other than propylene (i.e., the second random copolymer) include propylene-1-butene random copolymers, propylene-1-hexene random copolymers, propylene-1-octene random copolymers, and propylene-1-decene random copolymers.

Examples of the random copolymer made of constituent units derived from propylene, constituent units derived from ethylene, and constituent units derived from an α-olefin other than propylene (i.e., the third random copolymer) include propylene-ethylene-1-butene copolymers, propylene-ethylene-1-hexene copolymers, propylene-ethylene-1-octene copolymers, and propylene-ethylene-1-decene copolymers.

The content of the constituent units derived from ethylene in the first random copolymer, the content of the constituent units derived from an α-olefin other than propylene in the second random copolymer, and the total content of the constituent units derived from ethylene and the constituent units derived from an α-olefin other than propylene in third random copolymer are each preferably 0.1 to 40% by weight, more preferably 0.1 to 30% by weight, and still more preferably 2 to 15% by weight. Then, the content of the constituent units derived from propylene is preferably 60 to 99.9% by weight, more preferably 70 to 99.9% by weight, and still more preferably 85 to 98% by weight.

<Propylene-Based Block Copolymer>

As mentioned above, the propylene-based block copolymer in the present invention is a polymerization material comprising a polymer component (I) comprising a propylene homopolymer or a polymer comprising constituent units derived from propylene and a polymer component (II) comprising a copolymer of propylene with at least one comonomer selected from the group consisting of ethylene and α-olefins other than propylene. It is possible to produce the polymerization material by multistage polymerization including a polymerization step of an earlier stage of generating the polymer component (I) and a polymerization step of generating the polymer component (II) in the presence of the polymer component (I) generated in the earlier stage. It is possible to perform polymerization using a catalyst that can be used for production of the propylene-based random copolymer.

The polymer component (I) comprises a propylene homopolymer or a polymer comprising constituent units derived from propylene. Examples of the polymer comprising constituent units derived from propylene include propylene copolymers comprising units derived from at least one comonomer selected from the group consisting of ethylene and α-olefins other than propylene (preferably α-olefins having 4 to 10 carbon atoms) and units derived from propylene.

When the polymer component (I) comprises a polymer comprising constituent units derived from propylene, the content of the units derived from at least one comonomer is 0.01% by weight or more and less than 20% by weight in total, where the weight of the polymer component (I) is 100% by weight.

In α-olefins other than propylene, it is preferred that the number of carbon atoms be 4 to 10, and such α-olefins are more preferably 1-butene, 1-hexene, and 1-octene, and still more preferably 1-butene.

Examples of the polymer comprising constituent units derived from propylene that constitutes the polymer component (I) include propylene-ethylene copolymers, propylene-1-butene copolymers, propylene-1-hexene copolymers, propylene-1-octene copolymers, propylene-ethylene-1-butene copolymers, propylene-ethylene-1-hexene copolymers, and propylene-ethylene-1-octene copolymers.

Examples of the polymer component (I) preferably include propylene homopolymers, propylene-ethylene copolymers, propylene-1-butene copolymers, and propylene-ethylene-1-butene copolymers, and from the viewpoint of the rigidity of the molded article made of the resin composition, a propylene homopolymer is particularly preferred.

The polymer component (II) comprises a copolymer having constituent units derived from at least one comonomer selected from the group consisting of ethylene and α-olefins other than propylene and constituent units derived from propylene.

The content of the units derived from the at least one comonomer contained in the polymer component (II) is preferably 20 to 80% by weight, and more preferably 20 to 60% by weight, where the weight of the polymer component (II) is 100% by weight.

It is preferred that the α-olefin other than propylene constituting the polymer component (II) be an α-olefin having 4 to 10 carbon atoms, and examples of the α-olefin other than propylene include α-olefins similar to α-olefins other than propylene that may constitute the polymer component (I).

Examples of the copolymer constituting the polymer component (II) include propylene-ethylene copolymers, propylene-ethylene-1-butene copolymers, propylene-ethylene-1-hexene copolymers, propylene-ethylene-1-octene copolymers, propylene-ethylene-1-decene copolymers, propylene-1-butene copolymers, propylene-1-hexene copolymers, propylene-1-octene copolymers, and propylene-1-decene copolymer. Propylene-ethylene copolymers, propylene-1-butene copolymers, and propylene-ethylene-1-butene copolymers are preferred, and propylene-ethylene copolymers are more preferred.

The content of the polymer component (II) in the polymerization material comprising the polymer component (I) and the polymer component (II) is preferably 1 to 50% by weight, more preferably 1 to 40% by weight, still more preferably 5 to 30% by weight, and most preferably 8 to 15% by weight, where the weight of the polymerization material comprising the polymer component (I) and the polymer component (II) is 100% by weight.

When the polymer component (I) of the polymerization material is a propylene homopolymer, examples of the polymerization material include (propylene)-(propylene-ethylene) block copolymers, (propylene)-(propylene-ethylene-1-butene) block copolymers, (propylene)-(propylene-ethylene-1-hexene) block copolymers, (propylene)-(propylene-ethylene-1-octene) block copolymers, (propylene)-(propylene-1-butene) block copolymers, (propylene)-(propylene-1-hexene) block copolymers, (propylene)-(propylene-1-octene) block copolymers, and (propylene)-(propylene-1-decene)block copolymer.

When the polymer component (I) of the polymerization material is a propylene copolymer comprising constituent units derived from propylene, examples of the polymerization material include (propylene-ethylene)-(propylene-ethylene) block copolymers, (propylene-ethylene)-(propylene-ethylene-1-butene) block copolymers, (propylene-ethylene)-(propylene-ethylene-1-hexene) block copolymers, (propylene-ethylene)-(propylene-ethylene-1-octene) block copolymers, (propylene-ethylene)-(propylene-ethylene-1-decene) block copolymers, (propylene-ethylene)-(propylene-1-butene) block copolymers, (propylene-ethylene)-(propylene-1-hexene) block copolymers, (propylene-ethylene)-(propylene-1-octene) block copolymers, (propylene-ethylene)-(propylene-1-decene) block copolymers, (propylene-1-butene)-(propylene-ethylene) block copolymers, (propylene-1-butene)-(propylene-ethylene-1-butene) block copolymers, (propylene-1-butene)-(propylene-ethylene-1-hexene) block copolymers, (propylene-1-butene)-(propylene-ethylene-1-octene) block copolymers, (propylene-1-butene)-(propylene-ethylene-1-decene) block copolymers, (propylene-1-butene)-(propylene-1-butene) block copolymers, (propylene-1-butene)-(propylene-1-hexene) block copolymers, (propylene-1-butene)-(propylene-1-octene) block copolymers, (propylene-1-butene)-(propylene-1-decene) block copolymers, (propylene-1-hexene)-(propylene-1-hexene) block copolymers, (propylene-1-hexene)-(propylene-1-octene) block copolymers, (propylene-1-hexene)-(propylene-1-decene) block copolymers, (propylene-1-octene)-(propylene-1-octene) block copolymers, and (propylene-1-octene)-(propylene-1-decene)block copolymers.

As the polymerization material comprising the polymer component (I) and the polymer component (II), (propylene)-(propylene-ethylene) block copolymers, (propylene)-(propylene-ethylene-1-butene) block copolymers, (propylene-ethylene)-(propylene-ethylene) block copolymers, (propylene-ethylene)-(propylene-ethylene-1-butene) block copolymers, and (propylene-1-butene)-(propylene-1-butene) block copolymers are preferred, and (propylene)-(propylene-ethylene) block copolymers are more preferred.

The limiting viscosity number of the polymer component (I) to be measured in tetralin at 135° C. (hereinbelow, may be denoted as $[\eta]I$) is preferably 0.1 to 2 dl/g, more preferably 0.5 to 1.5 dl/g, and still more preferably 0.7 to 1.3 dl/g.

The limiting viscosity number of the polymer component (II) to be measured in tetralin at 135° C. (hereinbelow, may be denoted as $[\eta]II$) is preferably 1 to 10 dl/g, more preferably 2 to 10 dl/g, and still more preferably 5 to 8 dl/g.

Additionally, the ratio of $[\eta]II$ to $[\eta]I$ ($[\eta]II/[\eta]I$) is preferably 1 to 20, more preferably 2 to 10, and still more preferably 2 to 9.

The limiting viscosity number (unit: dl/g) in the present invention is a value to be measured using tetralin and at a temperature of 135° C. by the following method.

The reduced viscosity was measured at three points of concentration of 0.1 dl/g, 0.2 dl/g, and 0.5 g/dl using an Ubbelohde type viscometer. The limiting viscosity number is determined by a method described in "Kobunshi yoeki, Kobunshi jikkengaku 11" (published by Kyoritsu Shuppan Co., Ltd. in 1982), page 491, that is, by an extrapolation method including plotting reduced viscosities for concentrations and then extrapolating the concentration to zero.

When the propylene-based polymer of the component (A) is a polymerization material comprising the polymer component (I) and the polymer component (II) formed by multistage polymerization, a portion of the polymer component formed in the polymerization of the earlier stage is extracted from the polymerization vessel where the polymerization was performed to determine the limiting viscosity number of the polymer component, the limiting viscosity number of the polymerization material finally obtained by the multistage polymerization (hereinbelow, denoted as [η]Total) is determined, and the limiting viscosity number of the polymer component formed in the polymerization of the latter stage is calculated using these limiting viscosity number values and the content of each polymer component.

Alternatively, when the polymerization material comprising the polymer component (I) and the polymer component (II) is produced by a method in which the polymer component (I) is obtained by the polymerization step of an earlier stage and the polymer component (II) is obtained in the polymerization step of a latter stage, the measurement and calculation procedure of the content and limiting viscosity number ([η]Total, [η]I, and [η]II) of each of the polymer component (I) and the polymer component (II) is as follows.

The limiting viscosity number of the polymer component (II) is calculated from the limiting viscosity number of the polymer component (I) obtained in the polymerization step of the earlier stage ([η]I), the limiting viscosity number of the final polymer measured by the above method after the polymerization step of the latter stage (i.e., the polymerization material comprising the polymer component (I) and the polymer component (II)) ([η]Total), and the content of the polymer component (II) contained in the final polymer by the following expression:

$$[\eta]II = ([\eta]Total - [\eta]I \times XI)/XII$$

[η]Total: the limiting viscosity number of the final polymer (unit: dl/g)

[η]I: the limiting viscosity number of the polymer component (I) (unit: dl/g)

XI: the weight ratio of the polymer component (I) to the final polymer

XII: the weight ratio of the polymer component (II) to the final polymer.

It should be noted that XI and XII are calculated from the mass balance in the polymerizations.

The weight ratio XII of the polymer component (II) to the final polymer may be calculated using the heat of crystal fusion of each of the polymer component (I) and the final polymer by the following expression:

$$XII = 1 - (\Delta Hf)T/(\Delta Hf)P$$

(ΔHf)T: heat of fusion of the final polymer (the component (I) and the component (II)) (unit: cal/g)

(ΔHf)P: heat of fusion of the polymer component (I) (unit: cal/g).

The molecular weight distribution of the polymer component (I) measured by GPC (Mw/Mn) is preferably 3 or more and less than 7, and more preferably 3 to 5.

Component (B)

The component (B) in the present invention is an ethylene-α-olefin copolymer, and typically a copolymer having constituent units derived from ethylene and constituent units derived from an α-olefin having 4 to 10 carbon atoms. The ethylene-α-olefin copolymer of the component (B) is preferably a random copolymer.

The MFR of the ethylene-α-olefin copolymer of the component (B) measured at 230° C. and under a load of 2.16 kgf in compliance with JIS K7210 is preferably 0.1 to 50 g/10 minutes.

Examples of the α-olefin having 4 to 10 carbon atoms constituting the ethylene-α-olefin copolymer of the component (B) include α-olefins similar to α-olefins having 4 to 10 carbon atoms constituting the propylene-based polymer of the component (A). Specific examples thereof include α-olefins having a chain structure such as 1-butene, 1-pentene, 1-hexene, 4-methyl-1-pentene, 1-octene, and 1-decease and α-olefins having a cyclic structure such as vinylcyclopropane and vinylcyclobutane, and 1-butene, 1-hexene, and 1-octene are preferred.

Specific examples of the component (B) include ethylene-1-butene copolymers, ethylene-1-hexene copolymers, ethylene-1-octene copolymers, ethylene-1-decene copolymers, ethylene-(3-methyl-1-butene) copolymers, and copolymers of ethylene and an α-olefin having a cyclic structure.

The content of the α-olefin contained in the ethylene-α-olefin copolymer of the component (B) is preferably 1 to 49% by weight, more preferably 5 to 49% by weight, and still more preferably 24 to 49% by weight, where the weight of the ethylene-α-olefin copolymer is 100% by weight.

From the viewpoint of improving the impact resistance of the molded article, the density of the ethylene-α-olefin copolymer of the component (B) is 0.850 to 0.890 g/cm$^3$, more preferably 0.850 to 0.880 g/cm$^3$, and still more preferably 0.855 to 0.867 g/cm$^3$.

It is possible to produce the ethylene-α-olefin copolymer of the component (B) by polymerizing monomers using a polymerization catalyst. Examples of the polymerization catalyst include homogeneous catalyst systems such as metallocene catalysts and Ziegler-Natta type catalyst systems.

Examples of the homogeneous catalyst systems include catalyst systems composed of a compound having a cyclopentadienyl ring of a transition metal of Group 4 of the periodic table and an alkyl aluminoxane, catalyst systems composed of a compound having a cyclopentadienyl ring of a transition metal of Group 4 of the periodic table, a compound capable of reacting with the transition metal compound to form an ionic complex, and an organoaluminum compound, and catalyst systems prepared by making inorganic particles such as silica and clay mineral to support catalyst components such as a compound having a cyclopentadienyl ring of a transition metal of Group 4 of the periodic table, a compound to form an ionic complex, and an organoaluminum compound and modifying the inorganic particles, and additionally, include preliminarily polymerized catalyst systems which are prepared by preliminarily polymerizing ethylene or an α-olefin in the presence of the above catalyst systems.

Example of the Ziegler-Natta type catalyst systems include catalyst systems in which a solid transition metal component containing titanium is used in combination with an organic metal component.

As the ethylene-α-olefin copolymer of the component (B), a commercially available products may be used. Examples of commercially available products that can be used as the ethylene-α-olefin copolymer include ENGAGE (registered trademark) manufactured by Dow Chemical Japan Ltd., TAFMER (registered trademark) manufactured by Mitsui Chemicals, Inc., NEO-ZEX (registered trademark) and ULTZEX (registered trademark) manufactured by Prime Polymer Co., Ltd., and EXCELLEN FX (registered trademark), SUMIKATHENE (registered trademark), and ESPRENE SPO (registered trademark) manufactured by Sumitomo Chemical Company, Limited.

Component (C)

The component (C) in the present invention is a talc whose ratio of the average particle size D50[L] as measured by a laser diffraction method to the average particle size D50[S] as measured by a centrifugal sedimentation method (D50[L]/D50[S]) is at least 4.

D50[L] herein means a particle size when the number of particles accumulated from the smaller particle size side reaches 50% (particle size corresponding to 50%), in the measurement data of the particle size distribution on a volume basis measured by the laser diffraction method according to the method specified in JIS R1629.

D50[S] means a particle size when the number of particles accumulated from the smaller particle size side reaches 50%, in the measurement data of the particle size distribution on a volume basis measured by the centrifugal sedimentation method according to the method specified in JIS R1619. The average particle size thus defined may be generally referred to as the "particle size corresponding to 50%" and the like. The centrifugal sedimentation method is a method for measuring the particle size from the sedimentation velocity of particles generated by the centrifugal force. The sedimentation velocity of particles depends on the shape and density of the particles and the viscosity of a medium (liquid) in which particles are precipitated. The diameter of a sphere having the same sedimentation velocity as the sedimentation velocity of the particles measured is taken as the particle size of the particles measured.

The D50[L] of the talc as the component (C) is preferably 2 to 20 μm, and more preferably 4 to 12 μm.

The D50[S] of the talc as the component (C) is preferably 0.5 to 5 μm, and more preferably 1 to 3 μm.

Component (D)

The component (D) in the present invention is a nucleating agent represented by the following formula (1):

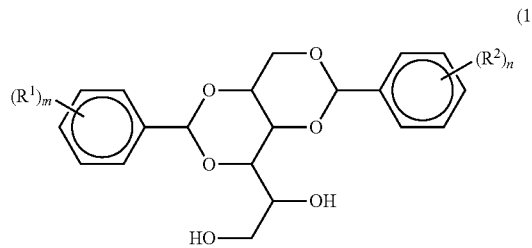

(1)

wherein $R^1$ and $R^2$ each independently of each other represent an alkyl group having 1 to 8 carbon atoms or a halogen group, and m and n each independently of each other represent an integer of 1 to 5;

when m is 2 or more, a plurality of $R^1$ present may be the same or different from each other; and when n is 2 or more, a plurality of $R^2$ present may be the same or different from each other.

In the above formula (1), $R^1$ and $R^2$ are preferably each independently of each other an alkyl group having 1 to 4 carbon atoms, and more preferably, $R^1$ and $R^2$ are each a methyl group.

The component (D) is preferably a nucleating agent represented by the above formula (1), wherein $R^1$ and $R^2$ are each a methyl group, and m and n are each 2.

The component (D) is preferably a nucleating agent represented by the following formula (2), wherein $R^1$ and $R^2$ each are as defined in the above formula (1).

[Resin Composition]

The resin composition according to the present invention comprises the above component (A), the component (B), the component (C) and the component (D). Based on the total weight of the above component (A), the above component (B) and the above component (C), taken as 100 parts by weight, the content of the component (A) is 40 to 65 parts by weight, the content of the component (B) is 10 to 25 parts by weight, the content of the component (C) is 25 to 35 parts by weight, and the content of the component (D) is 0.01 to 0.3 parts by weight. The content of the component (A) is preferably 45 to 60 parts by weight, the content of the component (B) is preferably 15 parts by weight or more, more preferably 20 parts by weight or more, and the content of the component (D) is preferably 0.1 to 0.3 parts by weight.

The total content of the above component (A), component (B), component (C) and component (D) contained in the resin composition is preferably 80% by weight or more, more preferably 90% by weight or more, and still more preferably 95% by weight or more, based on the total weight of the resin composition according to the present invention, which is taken as 100% by weight.

The MFR of the resin composition according to the present invention (measured at 230° C. and under a load of 2.16 kgf in compliance with JIS K7210) is preferably 15 g/10 minutes or more from the viewpoint of the fabricability of the resin composition.

The resin composition according to the present invention is obtained by melt-kneading each raw material component at preferably 180° C. or more, more preferably 180 to 300° C., and still more preferably 180 to 250° C. For the melt-kneading, for example, a Banbury mixer, a single screw extruder, a twin screw co-rotating extruder, and the like can be used.

Examples of the shape of the resin composition according to the present invention include a strand-like shape, a sheet-like shape, a flat plate-like shape, and a pellet-like shape, which is obtained by cutting a strand at an appropriate length. In order to fabricate the resin composition according to the present invention, from the viewpoint of the production stability of a molded article to be obtained, the shape of the resin composition before fabricated into the molded article is preferably a pellet-like shape of which length is 1 to 50 mm.

The resin composition according to the present invention is prepared by kneading raw material components. The kneading order of each raw material component is not particularly limited. The component (A), the component (B), the component (C) and the component (D) may be kneaded together, or after some components of the component (A), the component (B), the component (C) and the component (D) are kneaded, the obtained kneaded product and the remaining components may be kneaded.

The resin composition according to the present invention may contain additives. Examples of the additive include a neutralizer, an antioxidant, a UV absorber, a slip agent, an antistatic agent, an antiblocking agent, a processing aid, an organic peroxide, a coloring agent (inorganic pigment, organic pigment, or the like), a pigment dispersant, a foaming agent, a foam nucleating agent, a plasticizer, a flame retardant, a crosslinking agent, a crosslinking aid, a brightening agent, an antibacterial agent, a light diffusing agent, and a filler.

Examples of the filler include inorganic fillers other than talcs and organic fillers.

Examples of the inorganic filler other than talcs include inorganic fibers, glass flakes, mica, glass powder, glass beads, talcs, clay, alumina, silica, wollastonite, kaolin, asbestos, bentonite, calcium silicate, aluminum silicate, sand, diatomaceous earth, titanium oxide, iron oxide, aluminum oxide, magnesium oxide, antimony oxide, barium ferrite, strontium ferrite, beryllium oxide, pumice, magnesium hydroxide, aluminum hydroxide, basic magnesium carbonate, calcium carbonate, magnesium carbonate, dolomite, dawsonite, calcium sulfate, magnesium sulfate, basic magnesium sulfate fibers, calcium sulfite, carbon black, molybdenum sulfate, magnet powder, cadmium sulfide, and whiskers.

Examples of the organic filler include organic fibers, wood flour, bamboo flour, and melamine powder.

The resin composition according to the present invention may contain one additive or may contain two or more additives.

It is possible to obtain molded article by molding the resin composition according to the present invention. The molded article is preferably an injection-molded article produced by the injection molding method. Examples of the injection molding method includes methods such as the common injection molding method, injection foam molding method, supercritical injection foam molding method, ultra-high-speed injection molding method, injection compression molding method, gas assist injection molding method, sandwich molding method, sandwich foam molding method, and insert/outsert molding method.

The flexural modulus of an injection-molded article according to the present invention at 23° C. is preferably 2,000 MPa or more, more preferably 2,800 MPa or more, and still more preferably 3,000 to 5,000 MPa, from the viewpoint of the rigidity of the molded article.

Examples of applications of the injection-molded article according to the present invention include automotive members, home appliance product members, and containers. Of these, the object is suitable for automotive interior and exterior parts.

EXAMPLES

Hereinbelow, the present invention will be described with reference to Examples and Comparative Examples. The propylene-based polymer, ethylene-α-olefin copolymer, talc, nucleating agent, and additives used in Examples and Comparative Examples are given below.

(1) Component (A)
(A-1) (Propylene)-(Propylene-Ethylene) Block Copolymer
Polymerization material comprising a propylene homopolymer component and a propylene-ethylene copolymer component
MFR (measured at 230° C. and under a load of 2.16 kgf): 50 g/10 minutes
Limiting viscosity number ([η]I): 0.94 dl/g
([η]II): 3.20 dl/g
Isotactic pentad fraction: 0.978
Amount of the propylene-ethylene copolymer component: 29% by weight.
The ethylene content in the propylene-ethylene copolymer component: 30% by weight
(A-2) (Propylene)-(Propylene-Ethylene) Block Copolymer
Polymerization material comprising a propylene homopolymer component and a propylene-ethylene copolymer component
MFR (measured at 230° C. and under a load of 2.16 kgf): 140 g/10 minutes
Limiting viscosity number ([η]I): 0.78 dl/g
([η]II): 5.89 dl/g
Isotactic pentad fraction: 0.984
Amount of the propylene-ethylene copolymer component: 8.4% by weight
The ethylene content in the propylene-ethylene copolymer component: 37% by weight
(A-3) Propylene Homopolymer
The propylene homopolymer was produced by the gas phase polymerization method, using a polymerization catalyst obtained by the method described in Example 1 of Japanese Unexamined Patent Application Publication No. 2004-182981, under conditions such that a propylene-based polymer of the following physical properties can be obtained.
MFR (measured at 230° C. and under a load of 2.16 kgf): 120 g/10 minutes
Limiting viscosity number ([η]P): 0.92 dl/g
Isotactic pentad fraction: 0.980
(2) Component (B)
(B-1) Ethylene-1-Butene Copolymer
Density: 0.862 g/cm$^3$
MFR (measured at 230° C. and under a load of 2.16 kg): 2.5 g/10 minutes
(B-2) Ethylene-1-Octene Copolymer
Density: 0.857 g/cm$^3$
MFR (measured at 230° C. and under a load of 2.16 kg): 2.5 g/10 minutes
(3) Component (C)
(C-1) Talc-1
Average particle size D50[L]: 11.4 μm
Average particle size D50[S]: 2.54 μm
D50[L]/D50[S]: 4.49
(C-2) Talc-2
Average particle size D50[L]: 4.29 μm
Average particle size D50[S]: 2.55 μm
D50[L]/D50[S]: 1.68
(C-3) Talc-3
Average particle size D50[L]: 5.49 μm
Average particle size D50[S]: 2.91 μm
D50[L]/D50[S]: 1.89
(C-4) Talc-4
Average particle size D50[L]: 11.00 μm
Average particle size D50[S]: 4.51 μm
D50[L]/D50[S]: 2.44
(4) Component (D)
(D-1) Nucleating Agent-1
3:2,4-Bis(3,4-dimethylbenzylidene)sorbitol
(Millad3988 manufactured by Milliken Japan K.K.)
The physical properties of the raw material components and resin compositions were measured according to the methods as follows.
(1) Melt Flow Rate (MFR, Unit: g/10 Minutes)
The melt flow rate was measured according to the method specified in JIS K7210.
The measurement temperature was 230° C. and the measurement load was 2.16 kg.
(2) Limiting Viscosity Number ([η], Unit: dl/g)
The reduced viscosity was measured at three points of concentration of 0.1, 0.2 and 0.5 g/dl using an Ubbelohde type viscometer. The reduced viscosity was measured using tetralin as the solvent at a temperature of 135° C. The limiting viscosity number was determined by the extrapolation method including plotting reduced viscosities for concentrations and then extrapolating the concentration to zero.
(3) Average Particle Size D50[L] (Unit: μm)
The average particle size was measured using a Microtrac particle size analyzer MT-3300EXII manufactured by NIKKISO CO., LTD. according to the method specified in JIS R1629.
(4) Average Particle Size D50[S] (Unit: μm)
The average particle size was measured using a centrifugal sedimentation particle size analyzer SA-CP3 manufactured by SHIMADZU CORPORATION according to the method specified in JIS R1619.

(3) Production of Injection-Molded Article

Injection-molded articles used for measurement of the linear expansion coefficient in Examples 1 to 4 and Comparative Examples 1 to 5 were produced according to the following method. As the injection molding apparatus, SE180D, of which mold clamping force is 180 tons, manufactured by Sumitomo Heavy Industries, Ltd. was used. Flat plate-like injection-molded articles of 100 mm×400 mm×3 mm (thickness) were produced under conditions of a molding temperature of 220° C., an injection speed of 23 mm/sec, and a mold temperature of 50° C. and used for measurement.

(4) Linear Expansion Coefficient (Unit=11° C.)

A thermal mechanical analysis apparatus TMA/SS6100 manufactured by SII NanoTechnology Inc. was used to perform measurement as follows. A specimen of which size was 5 mm×10 mm×3 mm was cut out from the central part in the longitudinal direction of an injection-molded article produced according to the method of the above Production of injection-molded article. The specimen was set in the above apparatus, and the temperature was raised at a temperature rising rate of 5° C./minute from −20° C. to 130° C. to remove the residual strain in the molding. Thereafter, the specimen was set again in the apparatus so as to allow measurement of the dimensional change in the MD (flow direction of the resin) or the TD (direction perpendicular to the MD) in the injection molding, and the dimension at 23° C. was accurately measured. The temperature was raised at a temperature rising rate of 5° C./minute from −20° C. to 80° C., during which the dimensional change each in the MD and the TD was measured. The dimensional change per unit length and unit temperature was determined as the linear expansion coefficient. The smaller the linear expansion coefficient, the more satisfactory the dimension stability.

Examples 1 to 3 and Comparative Examples 1 to 3

The blending ratios of the propylene-based polymers (A-1), (A-2), and (A-3), ethylene-α-olefin copolymers (B-1) and (B-2), talc, and nucleating agent are shown in the following Table 1, wherein the total amount of (A-1), (A-2), (A-3), (B-1), (B-2), and talc is 100 parts by weight.

After the components were each measured at a predetermined blending ratio and homogeneously mixed in a Henschel mixer or a tumbler, the obtained mixture was kneading extruded using a twin-screw kneading extruder (model TEX44αII-498W-3V manufactured by The Japan Steel Works, Ltd.) at an amount extruded of 70 kg/hr and a number of screw revolutions of 300 rpm and under vent suction to produce a composition. The physical properties of the obtained compositions are shown in the following Table 1.

TABLE 1

| | | Example 1 | Example 2 | Example 3 | Comparative Example 1 | Comparative Example 2 | Comparative Example 3 |
|---|---|---|---|---|---|---|---|
| A-1 | % | 15 | 15 | — | 15 | 15 | 15 |
| A-2 | % | — | — | 46 | — | — | — |
| A-3 | % | 32 | 32 | — | 32 | 32 | 32 |
| B-1 | % | 11 | 23 | 11.5 | 11 | 11 | 11 |
| B-2 | % | 12 | — | 12.5 | 12 | 12 | 12 |
| C-1 | % | 30 | 30 | 30 | — | — | — |
| C-2 | % | — | — | — | 30 | — | — |
| C-3 | % | — | — | — | — | 30 | — |
| C-4 | % | — | — | — | — | — | 30 |
| D-1 | % | 0.2 | 0.2 | 0.2 | 0.2 | 0.2 | 0.2 |
| D50(L)/D50(S) | — | 4.49 | 4.49 | 4.49 | 1.68 | 1.89 | 2.44 |
| Linear expansion coefficient MD | 1/° C. | 3.6 | 3.8 | 3.3 | 4.0 | 4.3 | 4.3 |
| Linear expansion coefficient TD | 1/° C. | 4.7 | 4.5 | 3.8 | 5.0 | 5.7 | 5.7 |
| Linear expansion coefficient Average | 1/° C. | 4.1 | 4.2 | 3.6 | 4.5 | 5.0 | 5.0 |

The invention claimed is:

1. A propylene-based resin composition comprising:
   the following component (A);
   the following component (B);
   the following component (C); and
   the following component (D),
   wherein based on a total weight of the component (A), the component (B) and the component (C), taken as 100 parts by weight, a content of the component (A) is 40 to 65 parts by weight, a content of the component (B) is 10 to 25 parts by weight, a content of the component (C) is 25 to 35 parts by weight, and a content of the component (D) is 0.01 to 0.3 parts by weight:
   component (A): a propylene-based polymer;
   component (B): an ethylene-α-olefin copolymer having a density of 0.855 to 0.867 g/cm$^3$;
   component (C): a talc whose ratio of an average particle size D50[L] as measured by a laser diffraction method to an average particle size D50[S] as measured by a centrifugal sedimentation method (D50[L]/D50[S]) is at least 4; and
   component (D): a nucleating agent represented by the following formula (1):

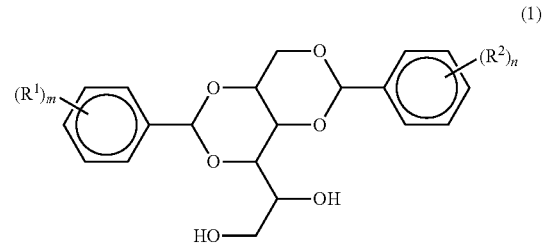

wherein R$^1$ and R$^2$ each represent a methyl group, and m and n are each 2.

2. An injection-molded article comprising the propylene-based resin composition according to claim 1.

* * * * *